(No Model.) 2 Sheets—Sheet 1.

G. W. REAGAN.
Animal Trap.

No. 236,456. Patented Jan. 11, 1881.

WITNESSES
M. E. Chaffee
D. P. Cowl

INVENTOR
George W. Reagan
by Nottingham & Blackburn
ATTORNEYS.

N. PETERS, PHOTO-LITHOGRAPHER, WASHINGTON, D. C.

(No Model.) 2 Sheets—Sheet 2.
G. W. REAGAN.
Animal Trap.
No. 236,456. Patented Jan. 11, 1881.
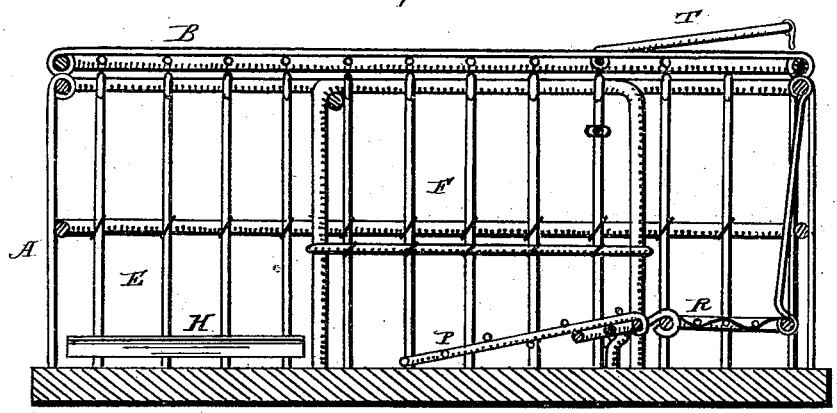
WITNESSES
W. E. Chaffee
D. P. Lowe
INVENTOR
George W. Reagan
by Nottingham & Blackburn
ATTORNEYS

UNITED STATES PATENT OFFICE.

GEORGE W. REAGAN, OF OWENSBOROUGH, KENTUCKY.

ANIMAL-TRAP.

SPECIFICATION forming part of Letters Patent No. 236,456, dated January 11, 1881.

Application filed March 18, 1880. (No model.)

*To all whom it may concern:*

Be it known that I, GEORGE W. REAGAN, a citizen of the United States, residing at Owensborough, in the county of Daviess and State of Kentucky, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in animal-traps; and it has for its object to provide a trap that will be at all times open for the entrance of an animal, but which will automatically close upon any attempt of the animal to escape; and also to provide for throwing the bait out of reach of an animal upon its entrance to the trap in order to keep the trap constantly baited. These objects I attain by the mechanism illustrated in the accompanying drawings, in which—

Figure 1:
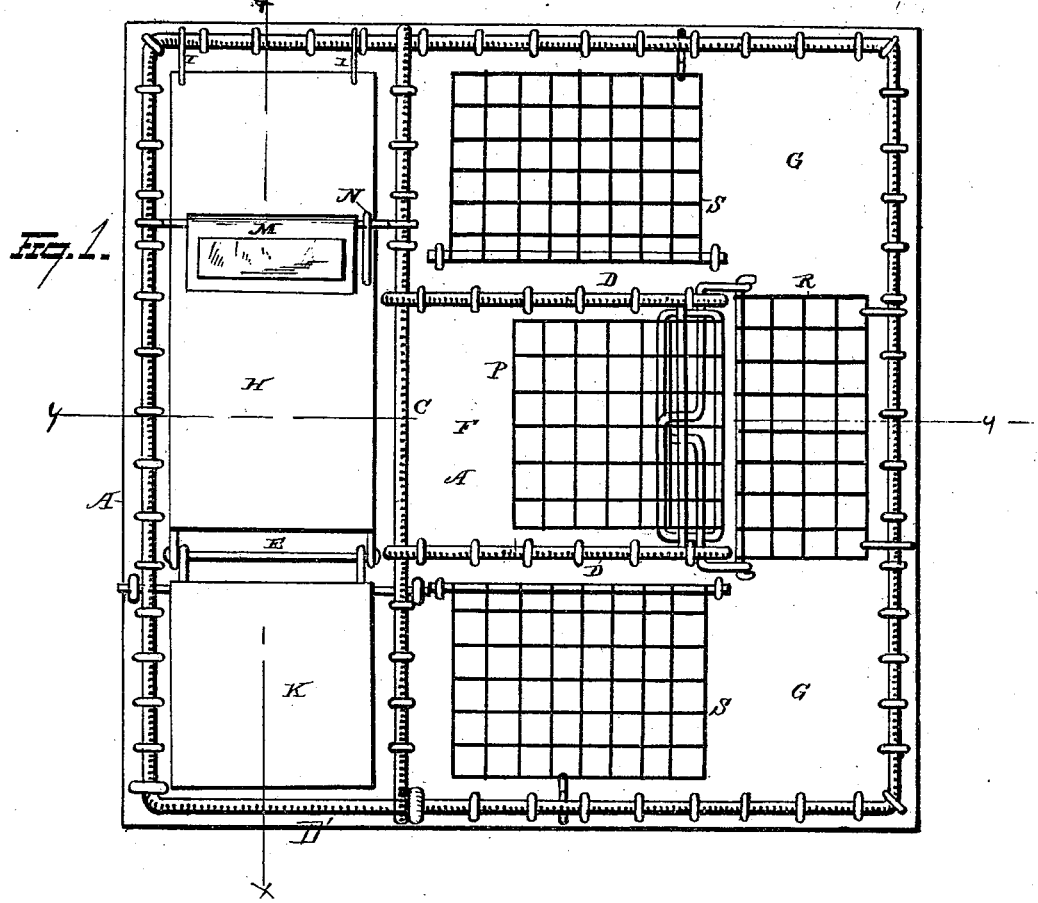
Figure 2:
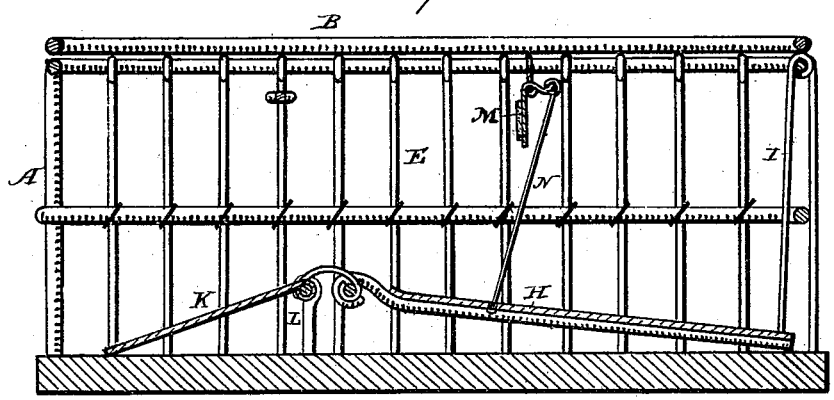

Figure 1 is a plan view of the trap with the top removed; Fig. 2, a sectional view on the line *x x* of Fig. 1, and Fig. 3 a sectional view on the line *y y* of Fig. 1.

The letter A indicates the trap, consisting of a rectangular cage of wire mounted on a wooden base and having a hinged cover, B. The interior of said trap is divided into separate compartments by means of the wire partitions C D, the compartment E being open at D' for the entrance of the animal, and compartment F, leading from compartment E to the compartments G, for the purpose hereinafter specified.

The letter H indicates a platform suspended in the compartment E by means of the rod I, and connected at its forward end to the lower part of a swinging door or barrier, K, pivoted to standards L, attached to the base of the trap in such manner that when the animal has entered compartment E and passed to the platform H its weight will elevate the door or barrier and close the passage to prevent his escape.

The letter M indicates a hinged shelf located in the upper part of the compartment E. Said shelf is connected with the platform H, by means of the rod N, in such manner that when the platform is depressed by the weight of the animal attempting to seize the bait the shelf will be elevated, so as to throw the bait out of reach.

The compartment F is provided with a door or barrier, P, which is connected with a platform, R, the said door and platform being similar to the door and platform before mentioned. The last-mentioned, or platform R, operates by the weight of the animal to raise the door or barrier P, and prevent the escape of the animal after entering the compartments G of the trap.

The letter S indicates a bait-holder, consisting of a wire frame hinged to the base of the trap and provided with suitable fastening devices, by which it may be secured over the bait, and at the same time prevent the animal from eating said bait.

The letter T indicates a door by means of which the animals may be removed from the trap.

As constructed it will be perceived that the trap is at all times open to receive the animal, but will automatically close to prevent escape, while provision is made to keep the bait out of reach, so as to keep the trap constantly set.

Having thus described my invention, what I claim, and desire to secure by Letters Patent, is—

1. In combination with the platform and hinged door or barrier, a hinged shelf connected to the platform by means of rods, whereby the platform is operated to throw the bait out of reach of the animal, substantially as specified.

2. The combination, in an animal-trap, of the hinged platform H, suspended in the compartment E by means of the rod I of the swinging door or barrier K, pivoted to standards L, attached to the base of the trap, the whole operated by the weight of the animal, when on the platform H, to close the door or barrier, substantially as and for the purpose specified.

In testimony whereof I affix my signature in presence of two witnesses.

GEORGE WASHINGTON REAGAN.

Witnesses:
ENERGY M. PETREE,
THEODORE ARNOLD.